(12) United States Patent
Depondt

(10) Patent No.: US 10,150,451 B2
(45) Date of Patent: Dec. 11, 2018

(54) TOP-LOCK WIPER BLADE ADAPTER

(71) Applicant: Robert Bosch GmbH, Stuttgart (DE)

(72) Inventor: Helmut Depondt, Boutersem (BE)

(73) Assignee: Robert Bosch GmbH, Stuttgart (DE)

( * ) Notice: Subject to any disclaimer, the term of this patent is extended or adjusted under 35 U.S.C. 154(b) by 208 days.

(21) Appl. No.: 14/442,719

(22) PCT Filed: Sep. 17, 2013

(86) PCT No.: PCT/EP2013/069211
§ 371 (c)(1),
(2) Date: May 13, 2015

(87) PCT Pub. No.: WO2014/075834
PCT Pub. Date: May 22, 2014

(65) Prior Publication Data
US 2016/0016554 A1    Jan. 21, 2016

(30) Foreign Application Priority Data
Nov. 14, 2012 (DE) .......... 10 2012 220 708

(51) Int. Cl.
*B60S 1/40* (2006.01)
(52) U.S. Cl.
CPC ........... *B60S 1/4048* (2013.01); *B60S 1/4064* (2013.01); *B60S 2001/4054* (2013.01)
(58) Field of Classification Search
CPC .... B60S 1/4048; B60S 1/4064; B60S 1/4038; B60S 1/4041; B60S 1/4043;
(Continued)

(56) References Cited

U.S. PATENT DOCUMENTS 7,607,194 B2 * 10/2009 Weber ................... B60S 1/3856
15/250.32
2005/0028312 A1    2/2005 Coughlin
(Continued)

FOREIGN PATENT DOCUMENTS

CN    202163402 U    3/2012
DE    102010062928    6/2012
(Continued)

OTHER PUBLICATIONS

International Search Report for Application No. PCT/EP2013/069211 dated Nov. 6, 2013 (English Translation, 2 pages).

*Primary Examiner* — Andrew A Horton
(74) *Attorney, Agent, or Firm* — Michael Best & Friedrich LLP

(57) ABSTRACT

The invention proceeds from a top-lock wiper blade adapter for coupling a wiper blade to a corresponding top-lock wiper arm adapter (10), having at least one main body (12) and at least one locking element (14) which is provided for locking the main body (12) to the top-lock wiper arm adapter (10). It is proposed that the top-lock wiper blade adapter has a blocking unit (16), which comprises at least one engagement element (18, 20) which engages at least partially over at least one inner abutment surface (22, 24) of the main body (12) and is provided to avoid the locking of a top-lock wiper arm adapter (26) which deviates from the corresponding top-lock wiper arm adapter (10) in terms of width (28).

18 Claims, 5 Drawing Sheets

(58) Field of Classification Search
CPC ...... B60S 2001/4054; B60S 2001/4051; B60S 2001/4058; B60S 2001/4061
See application file for complete search history.

(56) References Cited

U.S. PATENT DOCUMENTS

| | | | |
|---|---|---|---|
| 2006/0059647 A1* | 3/2006 | Ostrowski | B60S 1/3868 |
| | | | 15/250.32 |
| 2009/0151110 A1* | 6/2009 | Ku | B60S 1/387 |
| | | | 15/250.32 |
| 2010/0000041 A1* | 1/2010 | Boland | B60S 1/3868 |
| | | | 15/250.32 |
| 2010/0205763 A1 | 8/2010 | Ku | |
| 2012/0047673 A1* | 3/2012 | Depondt | B60S 1/387 |
| | | | 15/250.32 |
| 2012/0054976 A1* | 3/2012 | Yang | B60S 1/3867 |
| | | | 15/250.32 |

FOREIGN PATENT DOCUMENTS

| | | |
|---|---|---|
| EP | 1102693 A1 | 5/2001 |
| WO | 2012033364 | 3/2012 |

* cited by examiner

TOP-LOCK WIPER BLADE ADAPTER

BACKGROUND OF THE INVENTION

A top-lock wiper blade adapter for coupling a wiper blade to a corresponding top-lock wiper arm adapter, comprising at least one main body and at least one locking element, which is provided for locking the main body to the top-lock wiper arm adapter, has already been proposed. During installation, the top-lock wiper arm adapter is customarily at least partially moved in a vertical direction, which is perpendicular to a wiping plane of the wiper blade, relative to the top-lock wiper blade adapter. Two known types of top-lock wiper arm adapters differ, inter alia, slightly in overall width. The two types can be locked to a top-lock wiper blade adapter. However, the top-lock wiper arm adapter which is too wide does not bear here laterally against the top-lock wiper blade adapter and a malfunction and/or an inadvertent release of the connection between top-lock wiper arm adapter and top-lock wiper blade adapter can occur.

SUMMARY OF THE INVENTION

The invention is based on a top-lock wiper blade adapter for coupling a wiper blade to a corresponding top-lock wiper arm adapter, comprising at least one main body and at least one locking element which is provided for locking the main body to the top-lock wiper arm adapter.

It is proposed that the top-lock wiper blade adapter has a blocking unit which comprises at least one overlap element which at least partially overlaps at least one inner bearing surface of the main body and which is provided in order to avoid the locking of a further top lock wiper arm adapter which differs in a width from the corresponding top-lock wiper arm adapter, as a result of which erroneous installation of an unsuitable top-lock wiper arm adapter on the top-lock wiper blade adapter can advantageously be avoided. The blocking unit is particularly preferably provided in order to avoid the locking of a top-lock wiper arm adapter which is wider relative to the corresponding top-lock wiper arm adapter. In this context, a "top-lock wiper blade adapter" is intended to be understood as meaning, in particular, a wiper blade adapter which is provided for connection to a wiper arm by a top-lock principle. In this context, a "top-lock wiper arm adapter" is intended to be understood as meaning, in particular, a wiper arm adapter which is provided for connecting to a wiper blade by a top-lock principle. In particular, the constructional form of the top-lock wiper arm adapter differs from a hook-shaped constructional form and/or a side-lock constructional form. In this context, a "locking element" is intended to be understood as meaning, in particular, an element which is provided for locking at least two components relative to each other and/or for avoiding a relative movement of the at least two components with respect to each other. The locking element is preferably movable by a user into a release position in which the at least two components are releasable from each other. In this context, a "blocking unit" is intended to be understood as meaning, in particular, a unit which is provided for blocking a direction of movement of a certain component relative to a further component. In this context, an "overlap element" is intended to be understood as meaning, in particular, an element which is provided for overlapping at least one further component. The overlap element runs here over a surface of the component at a distance from the component. The blocking unit preferably has at least two overlap elements. In this context, an "inner bearing surface" is intended to be understood as meaning, in particular, a bearing surface which is provided for bearing against an inner side of an at least semi-closed component, in particular a component with a U shaped cross section, preferably with a top-lock wiper arm adapter. In this context, "provided" is intended to be understood as meaning, in particular, specially designed and/or equipped.

In a further refinement of the invention, it is proposed that the blocking unit has at least one side wall which is provided for bearing laterally against the outer surface of the corresponding top-lock wiper arm adaptor in a fitted state, as a result of which the blocking unit can be formed in a particularly stable manner. The at least one side wall is preferably at least partially formed by at least one overlap element. The blocking unit advantageously has at least two side walls. In this context, a "side wall" is intended to be understood as meaning, in particular, a wall which forms at least one side surface which extends in particular at least substantially perpendicularly to a wiping direction. The side surface advantageously has an extent of at least 1 mm, preferably of at least 2 mm, particularly preferably of at least 4 mm in each direction. In this context, "outer surface" is intended to be understood as meaning, in particular, on an outer side or a side which is open toward the surroundings.

Furthermore, it is proposed that the at least one side wall forms, with the at least one inner bearing surface, at least one receiving pocket which is provided for receiving the corresponding top-lock wiper arm adapter in a fitted state, as a result of which a particularly secure mounting of the top-lock wiper arm adapter on the top-lock wiper blade adapter can be achieved. In an advantageous manner, at least two side walls form, with at least two inner bearing surfaces, at least two receiving pockets. In this context, a "receiving pocket" is intended to be understood as meaning, in particular, a pocket-shaped, semi-closed element which is provided for receiving a further component in a form-fitting manner.

Furthermore, it is proposed that the at least one overlap element has at least one stop edge which is provided for blocking a top-lock wiper arm adapter differing from the corresponding top-lock wiper arm adapter during an installation operation. At least two overlap elements preferably have a total of at least two stop edges. In this context, a stop edge is intended to be understood as meaning, in particular, an edge which forms a stop for a further component. In particular, the stop edge has a height which is at least twice the size, preferably at least four times the size, of a width. In this context, "blocking" is intended to be understood as meaning, in particular, avoiding a movement in at least one direction by means of a form-fitting connection.

Particularly rapid and simple securing of the top-lock wiper arm adapter can be achieved if the at least one locking element is formed by at least one latching element. In this context, a "latching element" is intended to be understood as meaning, in particular, a spring-elastic element for producing a latching connection which is provided in order to be deflected elastically during installation.

Furthermore, a system is proposed, comprising a top-lock wiper blade adapter according to the invention and a corresponding top-lock wiper arm adapter, wherein, at least in an installation region, the corresponding top-lock wiper arm adapter has at least two limbs which, in a fitted state, in each case at least partially bear against the at least one overlap element, as a result of which particularly secure installation can be achieved.

The top-lock wiper blade adapter according to the invention is not intended to be limited here to the above-described application and embodiment. In particular, the top-lock wiper blade adapter according to the invention can have a number of individual elements, components and units differing from a number mentioned herein in order to carry out a function described herein.

BRIEF DESCRIPTION OF THE DRAWINGS

Further advantages emerge from the description below of the drawing. The drawing illustrates an exemplary embodiment of the invention. The drawing, the description and the claims contain numerous features in combination. A person skilled in the art will expediently also consider the features individually and put them together to form meaningful further combinations.

In the drawing.

DETAILED DESCRIPTION

Figure 1:
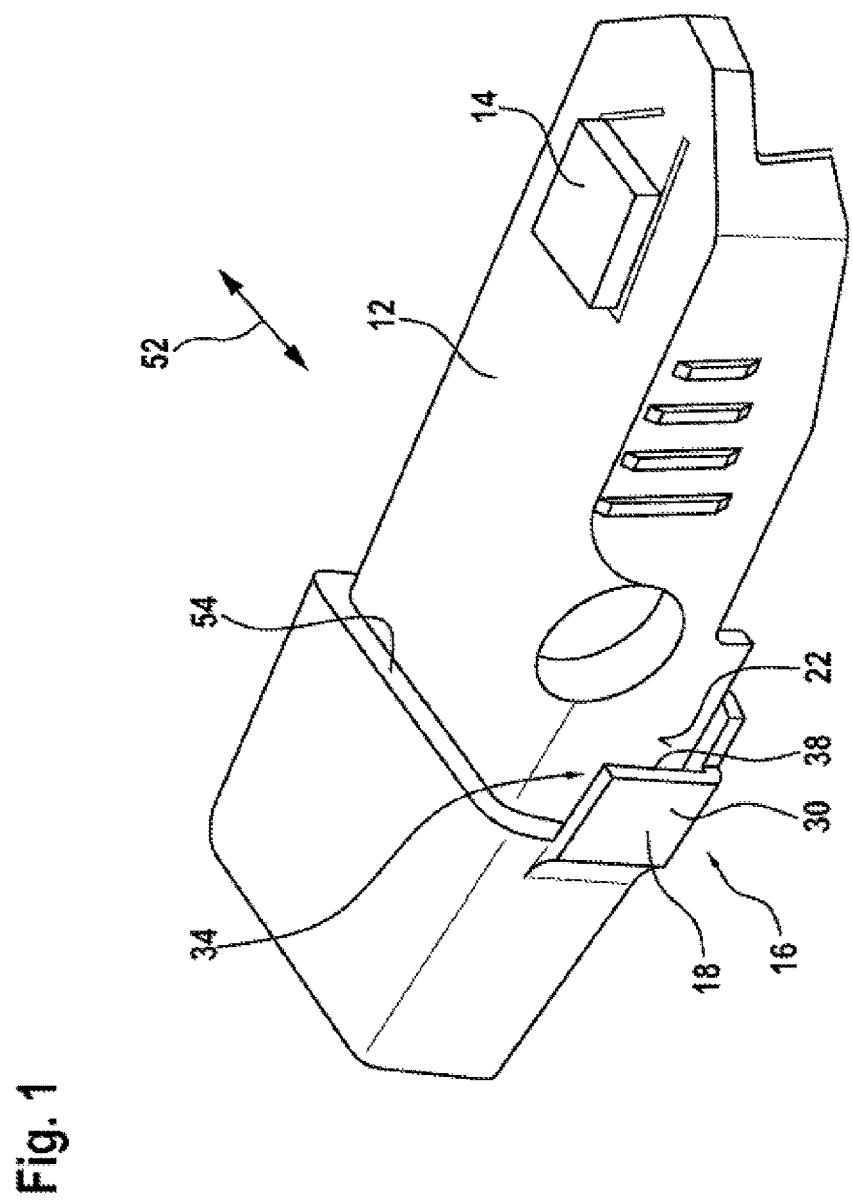
FIG. 1 shows a top-lock wiper blade adapter according to the invention in a perspective view.
Figure 2:
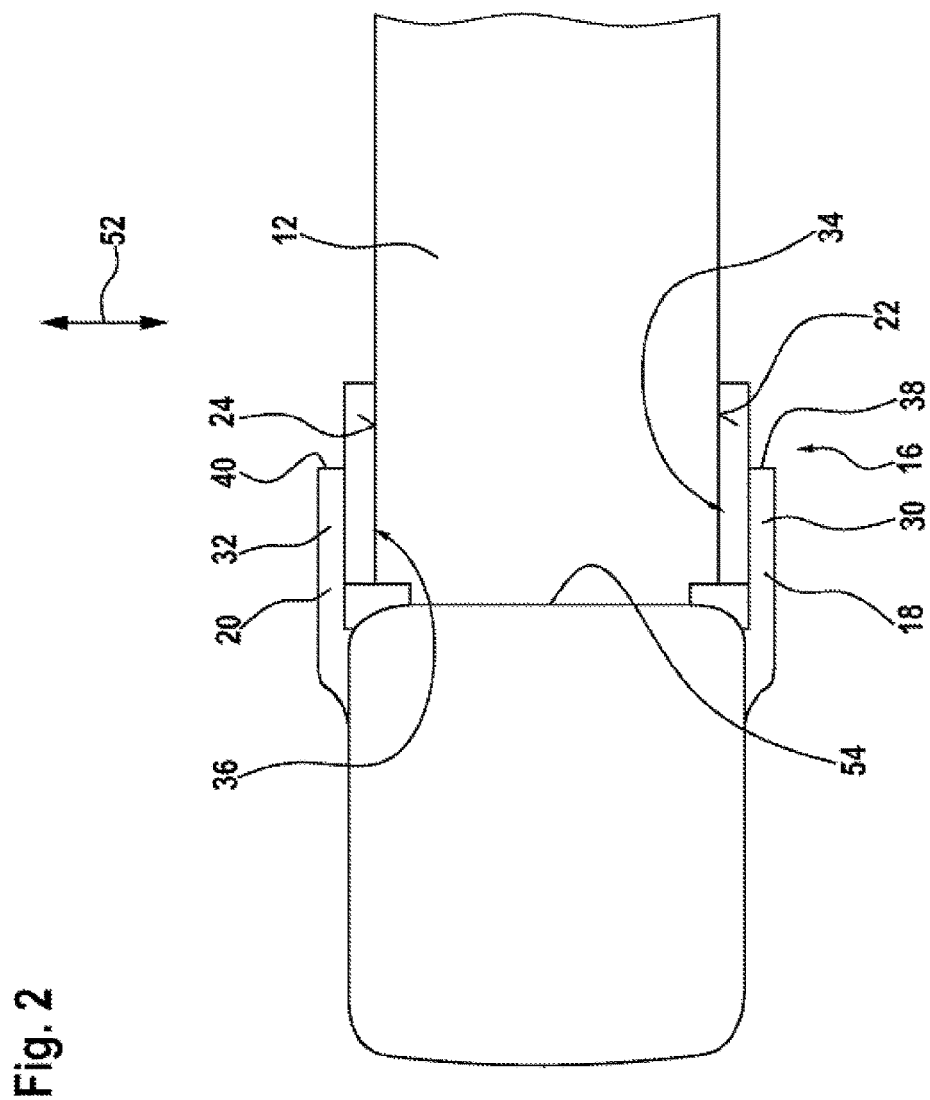
FIG. 2 shows the top-lock wiper blade adapter from FIG. 1 in a top view.

FIGS. 1 and 2 show a top-lock wiper blade adapter according to the invention for the articulated coupling of a bracket-free wiper blade (not illustrated specifically) to a corresponding top-lock wiper arm adapter 10. For the coupling, the top-lock wiper blade adapter has a main body 12 and a locking element 14. The locking element 14 is arranged on an upper side 48 of the main body 12, which upper side faces away from the wiper strip. Inner bearing surfaces 22, 24 extend on both sides from the upper side 48. The inner bearing surfaces 22, 24 run substantially parallel to each other and face away from each other. The inner bearing surfaces 22, 24 each enclose an angle of 90° with respect to the upper side 48. In a fitted state, the inner bearing surfaces 22, 24 each bear against an inner side 50 of the top-lock wiper arm adapter 10.

The locking element 14 is formed by a latching element. The latching element is deflectable in a spring-elastic manner during installation. The locking element 14 is provided for locking the main body 12 to the top-lock wiper arm adapter 10. A pivoting recess with a circular cross section that, in a fitted state, receives a bearing pin of the wiper blade and therefore produces a pivoting connection with the wiper blade runs through the main body 12 in a wiping direction 52. The main body 12 comprises an end stop edge 54 which forms a stop for the top-lock wiper arm adapter 10 in a final installation state.

The top-lock wiper blade adapter has a blocking unit 16 which comprises two overlap elements 18, 20. The overlap elements 18, 20 partially overlap the inner bearing surfaces 22, 24 of the main body 12. In other words, the overlap elements 18, 20 run at a distance from and parallel to the inner bearing surfaces 22, 24. The blocking unit 16 has two side walls 30, 32 which bear laterally against the outer surface of the corresponding top-lock wiper arm adapter 10 in a fitted state. The side walls 30, 32 bear here against an outer side 56 of the top-lock wiper arm adapter 10 in the fitted state. In the exemplary embodiment shown, the side walls 30, 32 are completely formed by the overlap elements 18, 20. It is also conceivable in this context for the side walls 30, 32 to be formed separately, at least in regions, from the overlap elements 18, 20. The side walls 30, 32 each form, with the inner bearing surfaces 22, 24, a receiving pocket 34, 36. The receiving pockets 34, 36 are therefore arranged on opposite sides of the main body 12.

Figure 3:
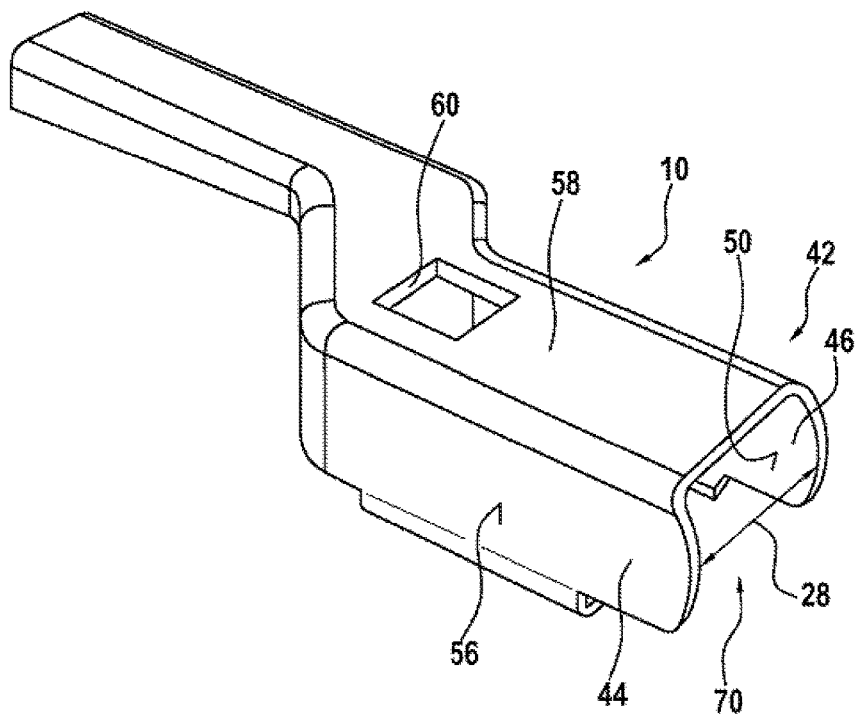
FIG. 3 shows a corresponding top-lock wiper arm adapter.

FIG. 3 shows the top-lock wiper arm adapter 10 corresponding to the top-lock wiper blade adapter. The top-lock wiper arm adapter 10 has a top wall 58 from which two limbs 44, 46 emerge, which limbs in each case enclose an angle of 90° with the top wall 58. Furthermore, a latching recess 60 which has a cross section corresponding to the locking element 14 is provided in the top wall 58. The limbs 44, 46 therefore run parallel to each other and define a receiving space 70 with a fixed width 28. The top-lock wiper arm adapter 10 therefore has a U-shaped cross section. An overall width of the top-lock wiper arm adapter 10 is 19 mm.

Figure 4:
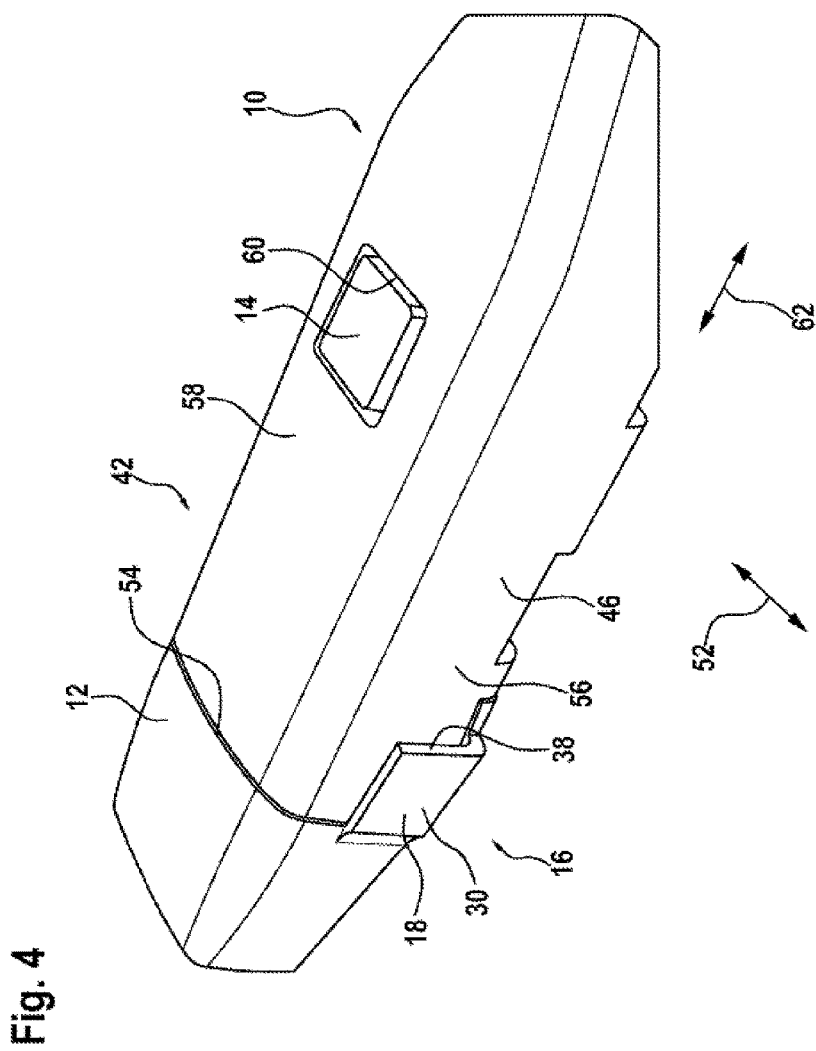
FIG. 4 shows the corresponding top-lock wiper arm adapter from FIG. 3 and the top-lock wiper blade adapter from FIG. 1 in a fitted state.

A width of the main body 12 corresponds to the width 28 of the receiving space 70. The main body 12 can therefore be pushed into the receiving space 70 in a form-fitting manner. The inner bearing surfaces 22, 24 bear here against the inner sides 50 of the limbs 44, 46 and guide the top-lock wiper arm adapter 10 as far as the end stop edge 54 of the main body 12 (FIG. 4). The receiving pockets 34, 36 receive the limbs 44, 46 of the corresponding top-lock wiper arm adapter 10 in a fitted state. The side walls 30, 32 cover the limbs 44, 46, as viewed in the wiping direction 52.

A movement of the main body 12 relative to the top-lock wiper arm adapter 10 in a longitudinal direction 62 running perpendicularly to the wiping direction 52 and parallel to a vehicle window to be wiped is avoided by the locking element 14 which is located in the latching recess 60.

The locking element 14 is movable by a user into a release position in which the main body 12 is releasable from the top-lock wiper arm adapter 10. In order to release the main body 12 from the top-lock wiper arm adapter 10, first of all the locking element 14 is deflected elastically. As soon as the latching between the main body 12 and the top-lock wiper arm adapter 10 is released, the top-lock wiper arm adapter 10 is moved in the longitudinal direction 62 relative to the main body 12 and is therefore removed.

Figure 5:
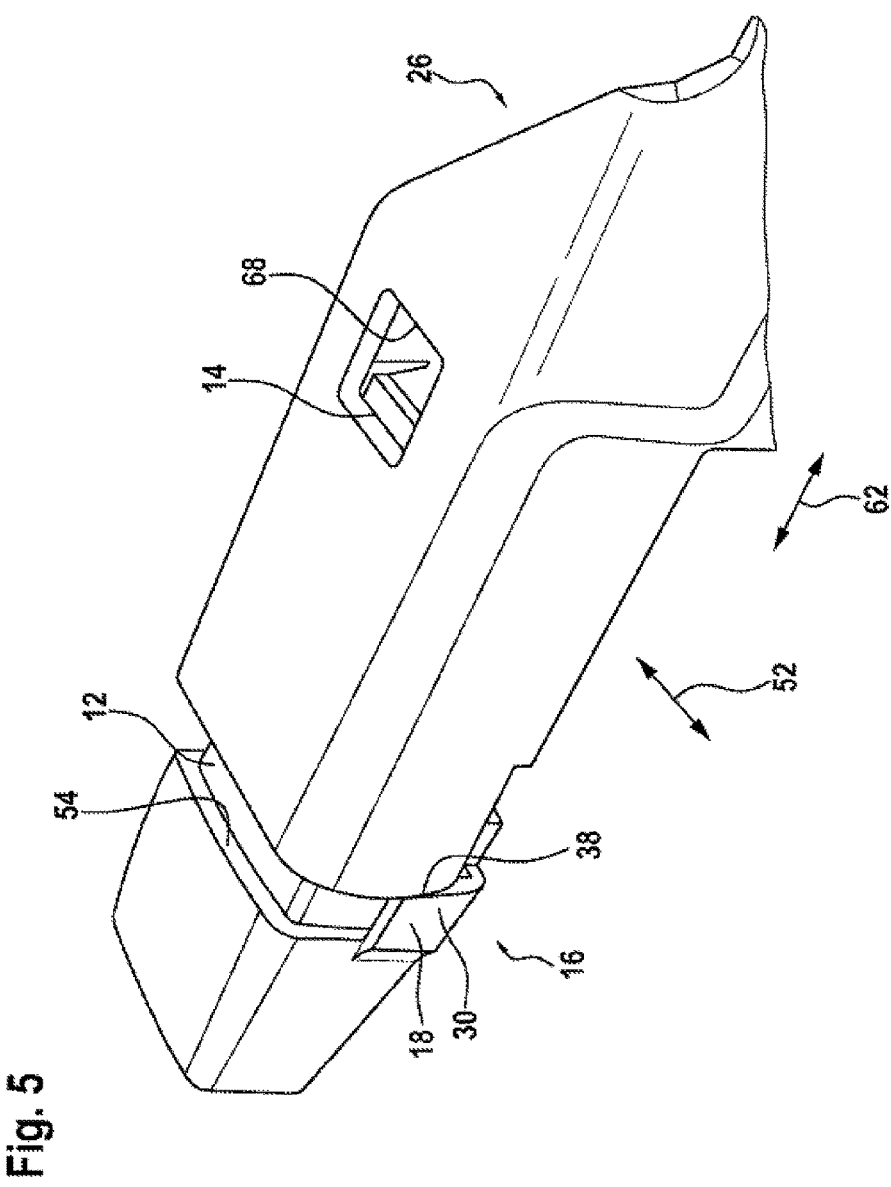
FIG. 5 shows a top-lock wiper arm adapter differing from the corresponding top-lock wiper arm adapter during an installation attempt.

FIG. 5 illustrates the top-lock wiper blade adapter together with a top-lock wiper arm adapter 26 which differs in width from the corresponding top-lock wiper arm adapter 10 shown in FIGS. 3 and 4. The differing top-lock wiper arm adapter 26 is 3 mm wider than the corresponding top-lock wiper arm adapter 10. An overall width of the differing top-lock wiper arm adapter 26 is 22 mm. By means of the greater width of the differing top-lock wiper arm adapter 26, limbs 64, 66 of the top-lock wiper arm adapter 26 do not engage in the receiving pockets 34, 36, in the installation operation shown, but rather bear against stop edges 38, 40 of the overlap elements 18, 20. The stop edges 38, 40 therefore block the top-lock wiper arm adapter 26 differing from the corresponding top-lock wiper arm adapter 10 during the installation operation.

The stop edges 38, 40 are arranged in front of the end stop edge 54, as viewed from the differing top-lock wiper arm adapter 26. During an installation operation, the differing top-lock wiper arm adapter 26 therefore remains free from contact with the end stop edge 54. Reaching of an end installation position or latching of the locking element 14 into a latching recess 68 of the differing top-lock wiper arm adapter 26 is avoided. The overlap elements 18, 20 therefore avoid the locking of the further top-lock wiper arm adapter 26 which differs in a width 28 from the corresponding top-lock wiper arm adapter 10. In this context, it is in principle also conceivable for only one overlap element to be provided for blocking the differing top-lock wiper arm adapter 26.

What is claimed is:

1. A top-lock wiper blade adapter for coupling a wiper blade to a corresponding top-lock wiper arm adapter (10), the top-lock wiper blade adapter comprising at least one main body (12) extending along a longitudinal direction (62) and at least one locking element (14) configured to lock the main body (12) to the top-lock wiper arm adapter (10), characterized by a blocking unit (16) which comprises at least one overlap element (18, 20) extending from a bottom of the main body (12) which at least partially overlaps at least one inner bearing surface (22, 24) along a side of the main body (12) and which is configured to avoid locking of a top-lock wiper arm adapter (26) which differs in a width (28) from the corresponding top-lock wiper arm adapter (10), wherein the main body (12) includes an end stop edge (54) that forms a stop surface for restraining longitudinal movement of the top-lock wiper arm adapter (10) as the top-lock wiper arm adapter (10) is installed onto the top-lock wiper blade adapter along the longitudinal direction (62), wherein the main body (12) includes a first upper surface, wherein the end stop edge (54) defines a raised ledge having a second upper surface offset from the first upper surface along a vertical direction that is perpendicular to both the longitudinal direction (62) and a wiping direction (52), wherein the raised ledge extends along a top of the main body (12) and along the wiping direction (52), wherein the raised ledge further extends vertically along the side of the main body, and wherein the at least one inner bearing surface (22, 24), the at least one overlap element (18, 20), and the raised ledge together form at least one receiving pocket (34, 36) to receive an end of the wiper arm adapter (10).

2. The top-lock wiper blade adapter as claimed in claim 1, characterized in that the blocking unit (16) has at least one vertically-extending side wall (30, 32) which is configured to bear laterally against an outer surface of the corresponding top-lock wiper arm adapter (10) in a fitted state.

3. The top-lock wiper blade adapter as claimed in claim 1, characterized in that the at least one overlap element (18, 20) has at least one additional stop edge (38, 40) which is configured to block the top-lock wiper arm adapter (26) differing from the corresponding top-lock wiper arm adapter (10) during an installation operation.

4. The top-lock wiper blade adapter as claimed in claim 1, characterized in that the blocking unit (16) is configured to avoid the locking of a top-lock wiper arm adapter (26) which is wider relative to the corresponding top-lock wiper arm adapter (10).

5. The top-lock wiper blade adapter as claimed in claim 1, characterized in that the at least one locking element (14) is formed by at least one latching element.

6. A system comprising the top-lock wiper blade adapter as claimed in claim 1, and the corresponding top-lock wiper arm adapter (10).

7. The system as claimed in claim 6, characterized in that, at least in an installation region (42), the corresponding top-lock wiper arm adapter (10) has at least two limbs (44, 46) which, in a fitted state, in each case at least partially bear against the at least one overlap element (18, 20).

8. A wiper blade comprising the top-lock wiper blade adapter as claimed in claim 1.

9. The top-lock wiper blade adapter as claimed in claim 1, wherein the end stop edge (54) extends entirely across a width of the top of the main body (12) along the wiping direction (52).

10. The top-lock wiper blade adapter as claimed in claim 9, wherein the at least one overlap element (18, 20) includes a first overlap element (18) and a second overlap element (20), wherein the end stop edge (54) extends directly between the first and second overlap elements (18, 20).

11. The top-lock wiper blade adapter as claimed in claim 1, wherein the at least one overlap element (18, 20) is monolithic with the main body (12).

12. The top-lock wiper blade adapter as claimed in claim 1, wherein the at least one locking element (14) includes an elastically deflectable tab positioned on a top of the main body (12), such that to release the main body (12) from the top-lock wiper arm adapter (10), the locking element (14) is deflected elastically, and the top-lock wiper arm adapter (10) may then be moved in a longitudinal direction relative to the main body (12).

13. The top-lock wiper blade adapter as claimed in claim 12, wherein the elastically deflectable tab is formed from a cut-out region on the top of the main body (12), and wherein the tab is elastically deflectable about an axis that extends perpendicular to the longitudinal direction.

14. A system comprising the top-lock wiper blade adapter as claimed in claim 12, and the corresponding top-lock wiper arm adapter (10), wherein the top-lock wiper arm adapter (10) includes a latching recess (60) which receives the locking element (14).

15. The top-lock wiper blade adapter as claimed in claim 12, wherein the end stop edge (54) is disposed at a first end of the top-lock wiper blade adapter, and the elastically deflectable tab is disposed at a second, opposite end of the top-lock wiper blade adapter.

16. The top-lock wiper blade adapter as claimed in claim 1, wherein the at least one locking element (14) is disposed on the first upper surface of the main body (12).

17. The top-lock wiper blade adapter as claimed in claim 1, wherein the main body includes a first portion having the first upper surface and a second portion having the second upper surface, wherein the at least one overlap element (18, 20) extends from the second portion.

18. The top-lock wiper blade adapter as claimed in claim 1, wherein the end stop edge (54) has a U-shaped profile when viewed along the longitudinal direction (62).

* * * * *